US008078618B2

(12) United States Patent
VanEpps et al.

(10) Patent No.: US 8,078,618 B2
(45) Date of Patent: Dec. 13, 2011

(54) AUTOMATIC MULTIMODE SYSTEM FOR ORGANIZING AND RETRIEVING CONTENT DATA FILES

(75) Inventors: Jeffrey J. VanEpps, Spencerport, NY (US); Daniel E. Gross, East Bethany, NY (US); Holly L. Brosnahan, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 423 days.

(21) Appl. No.: 11/342,789

(22) Filed: Jan. 30, 2006

(65) Prior Publication Data
US 2007/0185890 A1 Aug. 9, 2007

(51) Int. Cl.
*G06F 7/00* (2006.01)
(52) U.S. Cl. ........ 707/736; 707/913; 715/200; 715/243; 715/716; 715/730
(58) Field of Classification Search ............... 707/101, 707/3–5, 7
See application file for complete search history.

(56) References Cited

U.S. PATENT DOCUMENTS

| | | | |
|---|---|---|---|
| 4,396,903 A | 8/1983 | Habicht et al. | |
| 4,567,610 A | 1/1986 | McConnell | |
| 5,083,860 A | 1/1992 | Miyatake et al. | |
| 5,157,511 A | 10/1992 | Kawai et al. | |
| 5,164,831 A | 11/1992 | Kuchta et al. | |
| 5,339,385 A | 8/1994 | Higgins | |
| 5,382,974 A | 1/1995 | Soeda et al. | |
| 5,418,895 A | 5/1995 | Lee | |
| 5,424,945 A | 6/1995 | Bell | |
| 5,485,611 A | 1/1996 | Astle | |
| 5,493,677 A | 2/1996 | Balogh et al. | |
| 5,495,538 A | 2/1996 | Fan | |
| 5,539,841 A | 7/1996 | Huttenlocher et al. | |
| 5,576,759 A | 11/1996 | Kawamura et al. | |

(Continued)

FOREIGN PATENT DOCUMENTS

WO WO 2004/049206 6/2004

OTHER PUBLICATIONS

Keinosulce Fukunaga, *Introduction to Statistical Pattern Recognition*, Second Edition, Chapter 11, "Clustering", Oct. 1990, pp. 508-523.

(Continued)

*Primary Examiner* — Wilson Lee
*Assistant Examiner* — Jessica N Le
(74) *Attorney, Agent, or Firm* — Eugene I. Shkurko; David A. Novais; Roland R. Schindler, II

(57) ABSTRACT

A method for selecting a method for categorizing a collection of content data files from among a plurality of categorization methods, the method comprising the steps of identifying a collection of content data files, each content data file comprising image or audio data, determining a number of groups (G1) of content data files that will be generated when a first categorization method is applied to the collection of content data files; and designating a range of representations (R) that can be presented on the display, each representing a group of content data files. A first categorization method is selected when the number of groups G is within the range of representations (R); and a different categorization method is selected when the number of groups (G1) is not within range (R).

21 Claims, 8 Drawing Sheets

U.S. PATENT DOCUMENTS

| | | | |
|---|---|---|---|
| 5,579,471 | A | 11/1996 | Barber et al. |
| 5,594,807 | A | 1/1997 | Liu |
| 5,598,557 | A | 1/1997 | Doner et al. |
| 5,717,613 | A | 2/1998 | Nakajima |
| 5,717,643 | A | 2/1998 | Iwanami et al. |
| 5,719,643 | A | 2/1998 | Nakajima |
| 5,748,771 | A | 5/1998 | Fujiwara |
| 5,751,378 | A | 5/1998 | Chen et al. |
| 5,754,227 | A | 5/1998 | Fukuoka |
| 5,778,108 | A | 7/1998 | Coleman, Jr. |
| 5,805,746 | A | 9/1998 | Miyatake et al. |
| 5,809,161 | A | 9/1998 | Auty et al. |
| 5,809,202 | A | 9/1998 | Gotoh et al. |
| 5,842,194 | A | 11/1998 | Arbuckle |
| 5,852,823 | A | 12/1998 | De Bonet |
| 5,862,519 | A | 1/1999 | Sharma et al. |
| 5,872,859 | A | 2/1999 | Gur et al. |
| 5,875,265 | A | 2/1999 | Kasao |
| 5,911,139 | A | 6/1999 | Jain et al. |
| 5,937,136 | A | 8/1999 | Sato |
| 5,953,451 | A | 9/1999 | Syeda-Mahmood |
| 5,959,697 | A | 9/1999 | Coleman, Jr. |
| 5,963,670 | A | 10/1999 | Lipson et al. |
| 5,978,016 | A | 11/1999 | Lourette et al. |
| 5,982,369 | A | 11/1999 | Sciammarella et al. |
| 5,982,984 | A | 11/1999 | Inuiya |
| 6,005,613 | A | 12/1999 | Endsley et al. |
| 6,005,679 | A | 12/1999 | Haneda |
| 6,011,595 | A | 1/2000 | Henderson et al. |
| 6,012,091 | A | 1/2000 | Boyce |
| 6,021,231 | A | 2/2000 | Miyatake et al. |
| 6,061,497 | A | 5/2000 | Sasaki |
| 6,072,904 | A | 6/2000 | Desai et al. |
| 6,097,389 | A | 8/2000 | Morris et al. |
| 6,161,108 | A | 12/2000 | Ukigawa et al. |
| 6,195,458 | B1 | 2/2001 | Warnick et al. |
| 6,204,840 | B1 | 3/2001 | Petelycky et al. |
| 6,246,790 | B1 | 6/2001 | Huang et al. |
| 6,250,928 | B1 | 6/2001 | Poggio et al. |
| 6,272,461 | B1 | 8/2001 | Meredith et al. |
| 6,278,446 | B1 | 8/2001 | Liou et al. |
| 6,282,317 | B1 | 8/2001 | Luo et al. |
| 6,285,995 | B1 | 9/2001 | Abdel-Mottaleb et al. |
| 6,301,586 | B1 * | 10/2001 | Yang et al. ............................ 1/1 |
| 6,311,189 | B1 | 10/2001 | deVries et al. |
| 6,332,122 | B1 | 12/2001 | Ortega et al. |
| 6,335,742 | B1 | 1/2002 | Takemoto |
| 6,345,274 | B1 | 2/2002 | Zhu et al. |
| 6,351,556 | B1 | 2/2002 | Loui et al. |
| 6,360,237 | B1 | 3/2002 | Schulz et al. |
| 6,396,963 | B2 | 5/2002 | Shaffer et al. |
| 6,408,301 | B1 | 6/2002 | Patton et al. |
| 6,477,491 | B1 | 11/2002 | Chandler et al. |
| 6,486,896 | B1 | 11/2002 | Ubillos |
| 6,486,898 | B1 | 11/2002 | Martino et al. |
| 6,487,531 | B1 | 11/2002 | Tosaya et al. |
| 6,490,407 | B2 | 12/2002 | Niida |
| 6,519,000 | B1 | 2/2003 | Udagawa |
| 6,545,660 | B1 | 4/2003 | Shen et al. |
| 6,563,911 | B2 | 5/2003 | Mahoney |
| 6,564,209 | B1 | 5/2003 | Dempski et al. |
| 6,567,980 | B1 | 5/2003 | Jain et al. |
| 6,606,409 | B2 | 8/2003 | Warnick et al. |
| 6,606,411 | B1 | 8/2003 | Loui et al. |
| 6,629,104 | B1 * | 9/2003 | Parulski et al. ............... 382/307 |
| 6,683,649 | B1 | 1/2004 | Anderson |
| 6,701,063 | B1 | 3/2004 | Komoda et al. |
| 6,701,293 | B2 | 3/2004 | Bennett et al. |
| 6,707,939 | B1 | 3/2004 | Weinholz et al. |
| 6,734,909 | B1 | 5/2004 | Terane et al. |
| 6,738,075 | B1 | 5/2004 | Torres et al. |
| 6,741,963 | B1 | 5/2004 | Badt et al. |
| 6,751,343 | B1 | 6/2004 | Ferrell et al. |
| 6,784,925 | B1 | 8/2004 | Tomat et al. |
| 6,810,146 | B2 | 10/2004 | Loui et al. |
| 6,810,149 | B1 * | 10/2004 | Squilla et al. ............... 382/224 |
| 6,819,796 | B2 | 11/2004 | Hong et al. |
| 6,847,733 | B2 | 1/2005 | Savakis et al. |
| 6,865,297 | B2 | 3/2005 | Loui et al. |
| 6,950,989 | B2 | 9/2005 | Rosenzweig et al. |
| 7,054,870 | B2 * | 5/2006 | Holbrook ........................ 707/10 |
| 7,149,961 | B2 * | 12/2006 | Harville et al. ............... 715/202 |
| 7,281,216 | B2 * | 10/2007 | Bauer et al. ................... 715/764 |
| 7,296,032 | B1 * | 11/2007 | Beddow ................................ 1/1 |
| 7,415,662 | B2 * | 8/2008 | Rothmuller et al. .......... 715/200 |
| 7,508,437 | B2 * | 3/2009 | Suzuki ..................... 348/333.05 |
| 7,739,276 | B2 * | 6/2010 | Lee et al. ....................... 707/723 |
| 7,753,789 | B2 * | 7/2010 | Walker et al. ................... 463/42 |
| 2002/0075310 | A1 | 6/2002 | Prabhu et al. |
| 2002/0075322 | A1 | 6/2002 | Rosenzweig et al. |
| 2002/0075329 | A1 * | 6/2002 | Prabhu et al. ................. 345/854 |
| 2002/0075330 | A1 | 6/2002 | Rosenzweig et al. |
| 2002/0168108 | A1 | 11/2002 | Loui et al. |
| 2003/0007688 | A1 * | 1/2003 | Ono ............................... 382/167 |
| 2003/0009493 | A1 * | 1/2003 | Parker et al. ............... 707/500.1 |
| 2003/0012557 | A1 * | 1/2003 | Tingey et al. .................... 386/96 |
| 2003/0051022 | A1 * | 3/2003 | Sogabe et al. ................. 709/223 |
| 2003/0059107 | A1 | 3/2003 | Sun et al. |
| 2003/0084065 | A1 * | 5/2003 | Lin et al. ..................... 707/104.1 |
| 2003/0198390 | A1 | 10/2003 | Loui et al. |
| 2004/0005923 | A1 * | 1/2004 | Allard et al. ..................... 463/35 |
| 2004/0114904 | A1 * | 6/2004 | Sun et al. ......................... 386/46 |
| 2004/0158862 | A1 * | 8/2004 | Nam et al. ....................... 725/52 |
| 2004/0177319 | A1 * | 9/2004 | Horn .......................... 715/501.1 |
| 2004/0208365 | A1 | 10/2004 | Loui et al. |
| 2004/0208377 | A1 * | 10/2004 | Loui et al. ..................... 382/224 |
| 2005/0010602 | A1 | 1/2005 | Loui et al. |
| 2005/0050043 | A1 * | 3/2005 | Pyhalammi et al. .............. 707/6 |
| 2005/0091596 | A1 * | 4/2005 | Anthony et al. ............... 715/712 |
| 2005/0102637 | A1 * | 5/2005 | Suzuki .......................... 715/855 |
| 2005/0192924 | A1 * | 9/2005 | Drucker et al. .................... 707/1 |
| 2005/0200912 | A1 * | 9/2005 | Yamakado et al. ........... 358/450 |
| 2005/0225644 | A1 * | 10/2005 | Shibuya et al. ........... 348/207.99 |
| 2005/0240865 | A1 * | 10/2005 | Atkins et al. ................... 715/517 |
| 2006/0026529 | A1 * | 2/2006 | Paulsen et al. ................. 715/776 |
| 2006/0227992 | A1 * | 10/2006 | Rathus et al. ................. 382/100 |
| 2006/0259863 | A1 * | 11/2006 | Obrador et al. ............... 715/273 |
| 2007/0005581 | A1 * | 1/2007 | Arrouye et al. ................... 707/4 |
| 2007/0094251 | A1 * | 4/2007 | Lu et al. ............................ 707/5 |
| 2007/0118802 | A1 * | 5/2007 | Gerace et al. ................. 715/738 |
| 2008/0306921 | A1 * | 12/2008 | Rothmuller et al. ............. 707/3 |

OTHER PUBLICATIONS

John E. Freund et al., "Dictionary/Outline of Basic Statistics", 1991, pp. 49-50, Dover Publications, Inc.

Merriam-Webster Inc., "Webster's Ninth New Collegiate Dictionary", 1990, pp. 573.

Bhavan Gandhi et al., "Intelligent Multimedia Content Management on Mobile Devices", 0-7803-8603-5/04, 2004 IEEE.

Andrei Mikheev et al., "XML Tools and Architecture for Named Entity Recognition", Nov. 26, 1998, pp. 1-21, HCRC Language Technology Group, University of Edinburgh, United Kingdom.

Jerry R. Hobbs et al., "FASTUS: A Cascaded Finite-State Transducer for Extracting Information from Natural-Language Text", May 20, 1997, pp. 1-25, Artificial Intelligence Center, SRI International, California.

S.J. Young, "The HTK Hidden Markov Model Toolkit: Design and Philosophy", Sep. 6, 1994, pp. 1-27, CUED/F-INFENG/TR.152, Cambridge University Engineering Dept., Cambridge, England.

John C. Platt, "AutoAlbum: Clustering Digital Photographs Using Probabilistic Model Merging", 2000, pp. 1-6, Proceedings IEEE workshop on Content-Based Access of Image and Video Libraries.

Alexander C. Loui et al., "Automatic Image Event Segmentation and Quality Screening for Albuming Applications", 2000, pp. 1-4.

Jeffery P. Hansen et al., "Models for Time Coalescence in Event Logs", 1992 IEEE, pp. 221-227.

Keinosulce Fukunaga, *Introduction to Statistical Pattern Recognition*, "Clustering", pp. 508-523 (Oct. 1990).

Akio Nagasaka et al., "Automatic Video Indexing and Full-Video Search for Object Appearances", *Visual Database Systems, II*, 1992 IFIP, pp. 113-127.

IBM Viavoice 2000, www.speech-recognition.top-deals.us/articles/ibm-viavoice-2000.

Qian Huang Dam et al., "Forground/background Segmentation of Color Images by Integration of Multiple Cues", Internation Conference on *Image Processing, 1995 Proceedings*, Oct. 1995, vol. 1, pp. 246-249.

Eddie C. Shek et al., HRL Laboratories, LLC, "Semantic Agents for Content-Based Discovery in Distributed Image Libraries", 1998 IEEE, pp. 19-23.

Michael J. Swain et al., Univ. of Rochester, "Indexing Via Color Histograms", Proceedings of Third International Conf. on Computer Vision, Dec. 4-7, 1990, pp. 390-393.

V.V. Vinod and Hiroshi Murase, "Image Retrieval Using Efficient Local-Area Matching", Machine Vision and Applications, 1998, pp. 7-15.

* cited by examiner

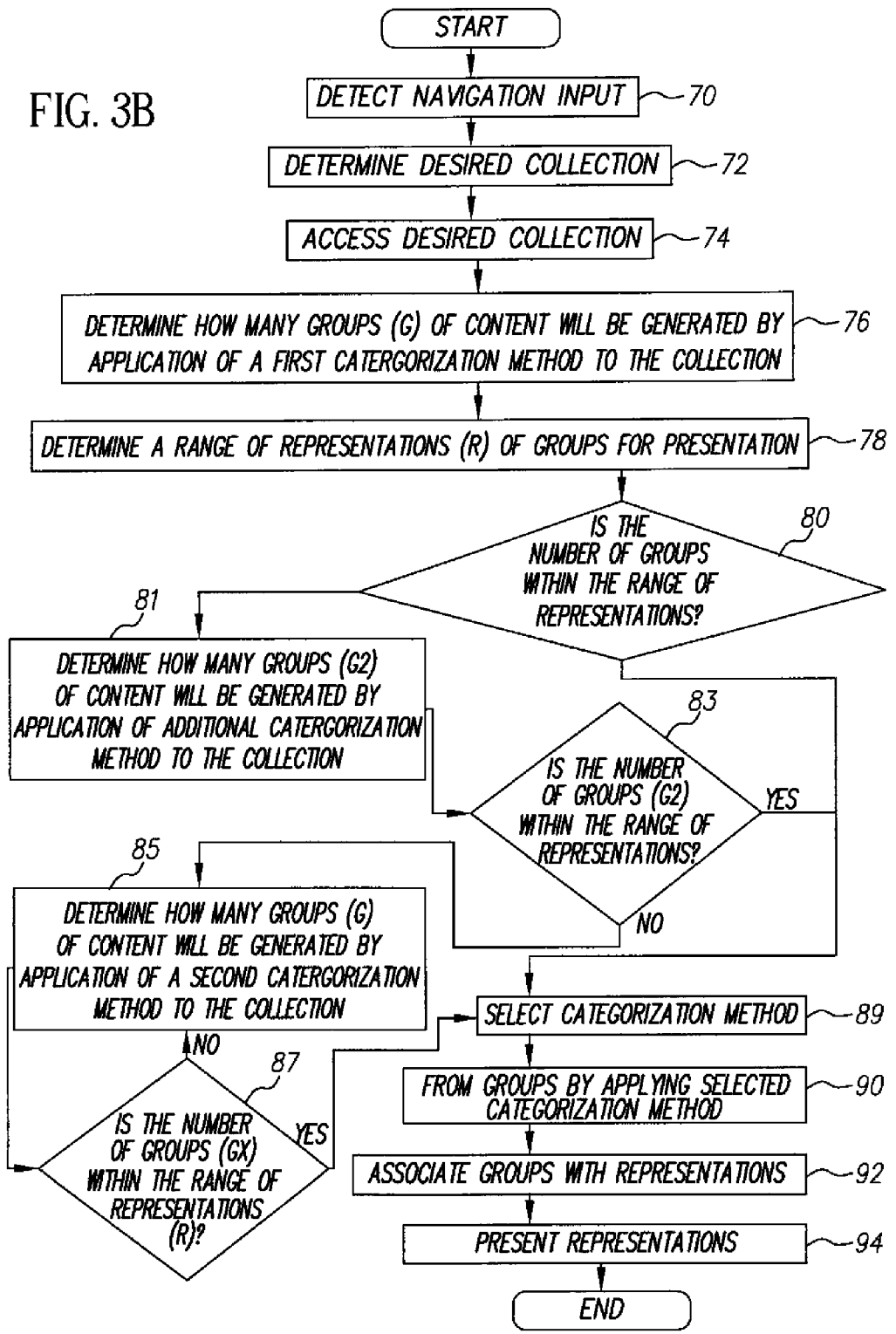

AUTOMATIC MULTIMODE SYSTEM FOR ORGANIZING AND RETRIEVING CONTENT DATA FILES

CROSS-REFERENCE TO RELATED APPLICATIONS

This application is related to U.S. Ser. No. 09/742,028, entitled TIMELINE-BASED GRAPHICAL USER INTERFACE FOR EFFICIENT IMAGE DATABASE BROWSING AND RETRIEVAL, filed Dec. 20, 2000 in the name of Elizabeth Rosenzweig et al.; U.S. Ser. No. 09/745,025, entitled COMPREHENSIVE, MULTI-DIMENSIONAL GRAPHICAL USER INTERFACE USING PICTURE METADATA FOR NAVIGATING AND RETRIEVING PICTURES IN A PICTURE DATABASE, filed Dec. 20, 2000 in the name of Elizabeth Rosenzweig et al.; U.S. Ser. No. 09/745,028 entitled GRAPHICAL USER INTERFACE ADAPTED TO ALLOW SCENE CONTENT ANNOTATION OF GROUPS OF PICTURES IN A PICTURE DATABASE TO PROMOTE EFFICIENT DATABASE BROWSING, filed Dec. 20, 2000 in the name of Prasad Prabhu et al.; U.S. Pat. No. 6,351,556 entitled METHOD FOR AUTOMATICALLY COMPARING CONTENT OF IMAGES FOR CLASSIFICATION INTO EVENTS issued Feb. 26, 2002 in the name of Loui et al.; U.S. Pat. No. 6,606,409 entitled FADE-IN AND FADE-OUT TEMPORAL SEGMENTS issued Aug. 12, 2003 in the name of Warnick et al.; U.S. Pat. No. 6,606,411 entitled METHOD FOR AUTOMATICALLY CLASSIFYING IMAGES INTO EVENTS issued Aug. 12, 2003 in the name of Loui et al.; U.S. Pat. No. 6,810,146 entitled METHOD AND SYSTEM FOR SEGMENTING AND IDENTIFYING EVENTS IN IMAGES USING SPOKEN ANNOTATIONS issued Oct. 26, 2004 in the name of Loui et al.; U.S. Pat. No. 6,847,733 entitled RETRIEVAL AND BROWSING OF DATABASE IMAGES BASED ON IMAGE EMPHASIS AND APPEAL issued Jan. 25, 2005 in the name of Savakis et al.; U.S. Pat. No. 6,865,297 entitled METHOD FOR AUTOMATICALLY CLASSIFYING IMAGES INTO EVENTS IN A MULTIMEDIA AUTHORING APPLICATION issued Mar. 8, 2005 Loui et al.; U.S. Pat. No. 6,915,011 entitled EVENT CLUSTERING OF IMAGES USING FOREGROUND/BACKGROUND SEGMENTATION issued Jul. 5, 2005 in the name of Loui et al.; U.S. Pat. No. 6,937,273 entitled INTEGRATED MOTION-STILL CAPTURE SYSTEM WITH INDEXING CAPABILITY issued Aug. 30, 2005 in the name of Loui; and U.S. Patent Application Publication No. 2002/0075329 entitled PICTURE DATABASE GRAPHICAL USER INTERFACE UTILIZING MAP-BASED METAPHORS FOR EFFICIENT BROWSING AND RETRIEVING OF PICTURES published Jun. 20, 2002 in the name of Prabhu et al.; U.S. Patent Application Publication No. 2003/0009493 entitled USING DIGITAL OBJECTS ORGANIZED ACCORDING TO A HISTOGRAM TIMELINE published Jan. 9, 2003 in the name of Parker et al.; U.S. Patent Application Publication No. 2003/0059107 entitled METHOD AND SYSTEM FOR AUTOMATED GROUPING OF IMAGES published Mar. 27, 2003 in the name of Sun et al.; U.S. Patent Application Publication No. 2003/0198390 entitled METHOD FOR AUTOMATICALLY CLASSIFYING IMAGES INTO EVENTS published Oct. 23, 2003 in the name of Loui et al.; U.S. Patent Application Publication No. 2004/0208365 entitled METHOD FOR AUTOMATICALLY CLASSIFYING IMAGES INTO EVENTS published Oct. 21, 2004 in the name of Loui et al.; and U.S. Patent Application Publication No. 2005/0010602 entitled SYSTEM AND METHOD FOR ACQUISITION OF RELATED GRAPHICAL MATERIAL IN A DIGITAL GRAPHICS ALBUM published Jan. 13, 2005 in the name of Loui et al.

FIELD OF THE INVENTION

The present invention relates to methods, systems and graphical user interfaces adapted for accessing digital image, audio, and video content in digital picture databases.

BACKGROUND OF THE INVENTION

Recent advances in the quality and ease of use of digital devices that capture, produce and/or generate digital still images, digital video images, audio recordings, animations, and other types of audio and/or visual content data files have allowed the creation of large collections of content data files. Such collections of content data files can be stored in a common storage location and can be distributed across a wide variety of storage locations. Further, collections of content data files can be formed in an ad hoc manner using content searching tools that are adapted to search large network systems, such as the Internet, for particular content. Accordingly, it is becoming increasingly common for users of a display device to be faced with the challenge of navigating through a large number content data files to be able to locate and access a content data file of interest. One way to help a user to do this is to provide a graphical metaphor that can be presented by the display device to help to provide a visual structure that facilitates navigation through the content data files of the collection. Such a graphical metaphor is usually referred to as a graphical user interface (GUI). Such a GUI conveniently organizes and groups digital content in a collection and allows a user to browse such organized and grouped content using one or more displayed screens.

A number of recently introduced GUIs provide users of content data file collections with different methods for navigating among content data files in the collection. Some navigation methods may work better than others, depending on the circumstances of use and the nature of the content in a collection. It would therefore be desirable to provide automatic methods for selecting from among available navigational and organizational methods to select from among different navigation methods those that can better enable a user-friendly and efficient navigation.

SUMMARY OF THE INVENTION

In one aspect of the invention, a method for selecting a method for categorizing content data files is provided. The method comprises the steps of: identifying a collection of content data files, each content data file comprising image, video, or audio data; determining a number of groups (G1) of content data files that will be generated when a first categorization method is applied to the identified collection of content data files; determining a range of representations (R) that can be presented on a display, each representation being associated with a group of content data files from the identified collection; selecting the first categorization method when the number of groups (G1) is within the range of representations; selecting a different categorization method when the number of groups generated by the first categorization method is not within the range of representations (R).

In another aspect of the invention, a method for operating a display device is provided. The method comprises the steps of: accessing a plurality of digital images; determine how many groups of images would formed from the plurality of images as a result of the application of each of the categorization methods; determining a range of representations (R) that can be displayed on an imaging device each representation being associated with one of the groups of images; and selecting a categorization method from the plurality of categorization methods that forms a number of groups (G) of images from the plurality of images when the number of groups (G) is within the range of representations (R).

In yet another aspect of the invention, a display device is provided. The display device comprises: a source of content data files; a user input adapted to receive a user request for content data files; and, a controller that receives the user request for content data files and accesses a collection of content data files in response thereto, the controller further being operable to determine groups of the content data files generated using a plurality of different of content data file categorization methods; wherein the controller selects one of the categorization methods from the plurality of different of categorization methods based upon whether application of that method will yield a number of groups of content data files that is within a determined range of representations of such groups.

BRIEF DESCRIPTION OF THE DRAWINGS

Features and advantages of the present invention will become apparent to those skilled in the art from the description below, with reference to the following drawing figures, in which:

FIG. 3B illustrates another embodiment of a method for operating a display device;

DETAILED DESCRIPTION OF THE INVENTION

Figure 1:
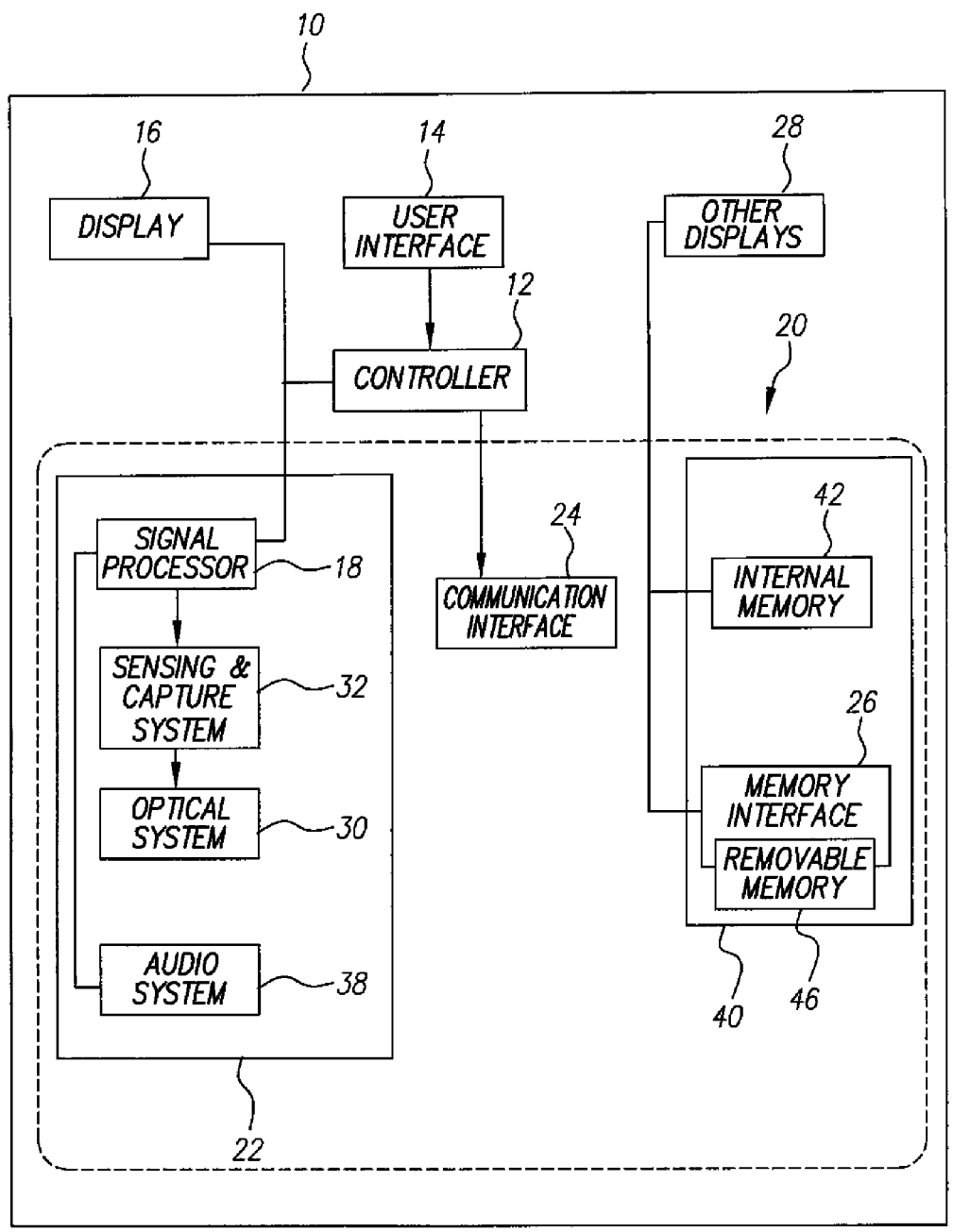
FIG. 1 is an example of a display device.

FIG. 1 shows one embodiment of a display device 10. As is shown in the embodiment of FIG. 1, display device 10 comprises a controller 12, a user interface 14, a display 16, a signal processor 18, a content source 20, an image capture system 22, a communication interface 24, a memory interface 26 and a memory 40. Controller 12 controls the operation of display device 10. Controller 12 can comprise a microprocessor such as a programmable general purpose microprocessor, a dedicated micro-processor or micro-controller, or any other system that can be used to control operation of display device 10.

Controller 12 cooperates with user interface 14 to allow display device 10 to interact with a user. User interface 14 can comprise any form of transducer or other device capable of receiving an input from a user and converting this input into a form that can be used by controller 12 in operating display device 10. For example, user interface 14 can comprise a touch screen input, a touch pad input, a 4-way switch, a 6-way switch, an 8-way switch, a stylus system, a mouse, a keyboard, a keypad, a trackball system, a joystick system, a voice recognition system, a gesture recognition system, affective sensing system, or other such systems.

Controller 12 also cooperates with display 16 to cause display 16 to present image content such as still images, sequences of still images, text, symbols, graphics, animations, streams of image information or other forms of video signals. Display 16 can comprise, for example, a color liquid crystal display (LCD), organic light emitting display (OLED) also known as an organic electroluminescent display (OELD) or other type of video display. Display 16 can be fixed to display device 10. Display 16 can also be separable from or separate from display device 10. In embodiments where display 16 is separable from or separate from display device 10, display device 10 and display 16 will each incorporate communication modules (not shown) capable of exchanging information that will allow controller 12 to control what is displayed on display 16. In other alternative embodiments, display device 10 can have more than one display 16. In the embodiment of FIG. 1, a signal processor 18 is shown. In certain embodiments, controller 12 can use signal processor 18 to cause or to help cause images to be formed and presented on display 16. In this regard signal processor 18 can provide display driver functions.

Display device 10 can also have other displays 28 such as a segmented LCD or LED display, an LED or other visible display device which can also permit controller 12 to provide information to a user. This capability is used for a variety of purposes such as establishing modes of operation, indicating control settings, user preferences, and providing warnings and instructions to a user of display device 10. Other systems such as known systems and actuators for generating audio signals, vibrations, haptic feedback and other forms of signals can also be incorporated into display device 10 for use in providing information, feedback and warnings to the user of display device 10. Using display 16 and/or other displays 28, display device 10 can present image content as well as information such as the status and mode of operation of display device 10.

Display device 10 is adapted to receive content data files and to present visual and audio signals in a human perceptible manner. As used hereinafter, the term content data file can comprise any form of digital data that can be used to generate human perceptible visual signals including but not limited to graphics, text, still images, sequences of still images, video streams and/or audio signals.

Content data files can be supplied to display device 10 by way of a content source 20. In the embodiment shown in FIG. 1, content source 20 includes three different systems, an image capture system 22, a communication interface 24 and a memory 40.

Image capture system 22 comprises lens system 30 and an image sensing system 32. In operation, light from a scene is focused by lens system 30 and forms an image at image sensing system 32. Lens system 30 can have one or more elements, be of a fixed focus type or can be manually or automatically adjustable. Lens system 30 is optionally adjustable to provide a variable zoom that can be varied manually or automatically. Other known arrangements can be used for lens system 30.

Image sensing system 32 converts light that is focused onto lens system 30 into image signals representing an image of the scene. Image sensing system 32 can use for example an image sensor (not shown) having a charge couple device (CCD), a complementary metal oxide sensor (CMOS), or any other electronic image sensor known to those of ordinary skill in the art.

Signal processor 18 receives the image signals from image sensing system 32 and processes these image signals to form image content. The image content can comprise one or more still images, multiple still images and/or a stream of apparently moving images such as a video segment. Where image content comprises a stream of apparently moving images, the image content can comprise image data stored in an interleaved or interlaced image form, a sequence of still images, and/or other forms known to those of skill in the art of digital video.

Signal processor 18 can apply various image processing algorithms to the image signals when forming image content. These algorithms can include, but are not limited to, color and exposure balancing, interpolation and compression. Where the image signal is in the form of an analog signal, signal processor 18 can also convert the analog signals into a digital form.

An optional audio system 38 is provided. Audio system 38 can include a microphone (not shown) and conventional amplification and analog to digital conversion circuits known for converting sonic energy into digital audio signals. Digital audio signals captured by audio system 38 are provided to signal processor 18. Signal processor 18 converts these audio signals into audio content in digital form. Where the audio content is captured in association with the image content, signal processor 18 automatically associates the image and audio content in a common digital file integrated with the image content. Audio system 38 can also include a speaker system and/or an audio output port to which a speaker or amplifier system can be joined for reproducing captured audio inputs and for reproducing, in audio form, audio from accessed content data filing.

Captured content data files are stored in a memory 40. Memory 40 can include conventional memory devices including solid state, magnetic, optical or other data storage devices. Memory 40 can be fixed within display device 10 or it can be removable in part or in whole. In the embodiment of FIG. 1, memory 40 is shown having an internal memory 42, comprising for example a hard drive, and a memory interface 26 that is adapted to cooperate with a removable memory 46, such as an optical, magnetic or other disk memory, or a semiconductor or other electronic memory.

Content source 20 can provide content data files that are captured by other devices and transferred to display device 10. In the embodiment of FIG. 1, this can be done by way of a data transfer or exchange using communication interface 24 or using of memory 40 to obtain data from a removable memory 46.

Communication interface 24 can be an optical, radio frequency or other transducer that converts image and other data into a form that can be conveyed to display device 10 by way of an optical signal, radio frequency signal or other form of signal. Examples of communication interface 24 include, but are not limited to, a cellular telephone transceiver, an 802.11 interface, a so called Blue Tooth transceiver, and an Infrared communication transceiver. Communication interface 24 can also be used to acquire a digital image and other information from a host computer or network (not shown). Communication interface 24 can also optionally be adapted to acquire image and/or audio content from sources such as conventional radio and television signals and from digital radio and television signals. Communication interface 24 can receive such content wirelessly or using circuit connections such as audio/video cables containing image and/or audio content.

Communication interface 24 can also receive signals containing information and instructions for execution by controller 12 including but not limited to, signals from a remote control device (not shown) and can operate display device 10 in accordance with such signals.

Similarly, content data files that are captured or otherwise provided by another device can be stored in the form of files on a removable memory 46 with removable memory 46 being operatively joined to memory interface 26. Memory interface 26 can comprise a port controlled by controller 12 to access digital imagery, either through a storage device such as a Compact Flash card, or through an interface connection such as a Universal Serial Bus (USB) connection. Controller 12 and memory interface 26 are operable using techniques known in the art to extract content data files from a removable card.

It will be appreciated that, in the embodiment of FIG. 1, content source 20 is shown having an image capture system 22, a communication interface 24 and a memory interface 26 for acquiring content. Such an embodiment can comprise, for example, a digital camera, a personal digital assistant having an image capture system such as the Palm Zire 71 or a cellular telephone or other mobile communication device having an image capture system. In other embodiments, content source 20 can comprise one of these sources of content, capture system 22, communication interface 24, or memory 40 or combinations of more than one. For example, display device 10 can have a content source 20 having only a communication interface 24 for obtaining content data files. Examples of such a device include, but are not limited to, a personal digital assistant, a cellular telephone, and a portable display system. Alternatively, in another example, display device 10 can have content source 20 having a communication interface 24 and a memory interface 26, examples of which include but are not limited to a personal picture viewer or a Palm IIIC personal digital assistant.

Content data files that are obtained from content source 20 are then stored in internal memory 42. Internal memory 42 and removable memory card 46 can consist of any of a number of rewritable memories, for example, a solid-state memory, Compact Flash-Cards, or a non-solid-state memory, for example a miniature disk drive or an optical drive.

Content data files can comprise data that is stored in a compressed form. For example where a content data file comprises a still image or a sequence of still images, the still image(s) can be stored in a compressed form such as by using the JPEG (Joint Photographic Experts Group) ISO 10918-1 (ITU-T.81) standard. This JPEG compressed image data is stored using the so-called "Exif" image format defined in the Exchangeable Image File Format version 2.2 published by the Japan Electronics and Information Technology Industries Association JEITA CP-3451. Similarly, other compression systems such as the MPEG-4 (Motion Pictures Export Group) or Apple QuickTime™ standard can be used to store digital image data in a video form. Other image compression and storage forms can be used.

Figure 2:
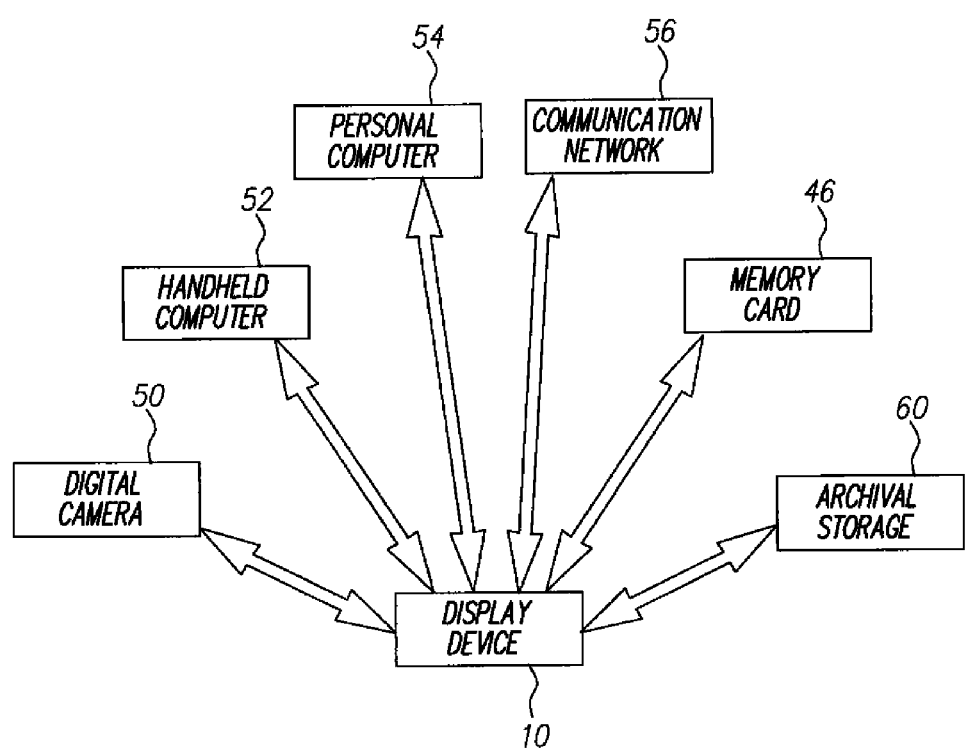
FIG. 2 illustrates a number of possible sources of content data files that can be accessed using the display device of FIG. 1.

As is illustrated in FIG. 2, display device 10 of FIG. 1 can obtain content data files by capturing the image content using image capture system 22, by obtaining content data files from a remote device using communication interface 24, and/or memory interface 26 to communicate with other sources of content data files including, but not limited to, memory card 46, digital camera 50, handheld portable computer 52, or personal computer 54, or communication network 56.

Internal memory 42 has a capacity for data storage including content data files. In some embodiments, the storage capacity of internal memory 42 may be quite large, however, in other embodiments it can be somewhat lower. In either type of embodiment, display device 10 can optionally be associated with an archival storage device 60 that can receive content data files from display device 10, and store vast quantities of such content data files using, for example, a mass memory such as an optical drive, RAID array, or semiconductor memory and that can supply content data files to display device 10 as requested, such as by way of a communication interface 24. In still other embodiments, communication interface 24 can be used to access collections of personal, commercial or other remote content that is stored on a separate device, a combination of separate devices or a communication network such as the internet that permits display device 10 to access content data files stored on a vast number of interconnected devices, many of which have local storage.

Such collections can be pre-existing or they can be collected in an ad hoc manner for example, in response to one or more search requests submitted by the user of display device 10 that cause controller 12 to initiate a search of a large compilation of data, such as the Internet for content data files having similar content and to create an ad hoc collection. Processor 34 can cause such accessed content to be loaded into memory 40 or can access such content by downloading such content data files or providing thumbnails, summaries or link to such content data files as necessary.

Accordingly, there is a need for display device 10 that can be operated in a manner that facilitates navigation through a large quantity of content data files in a convenient manner and that can be used to facilitate navigation through a variety of different databases, sources or storage locations.

Figure 3A:
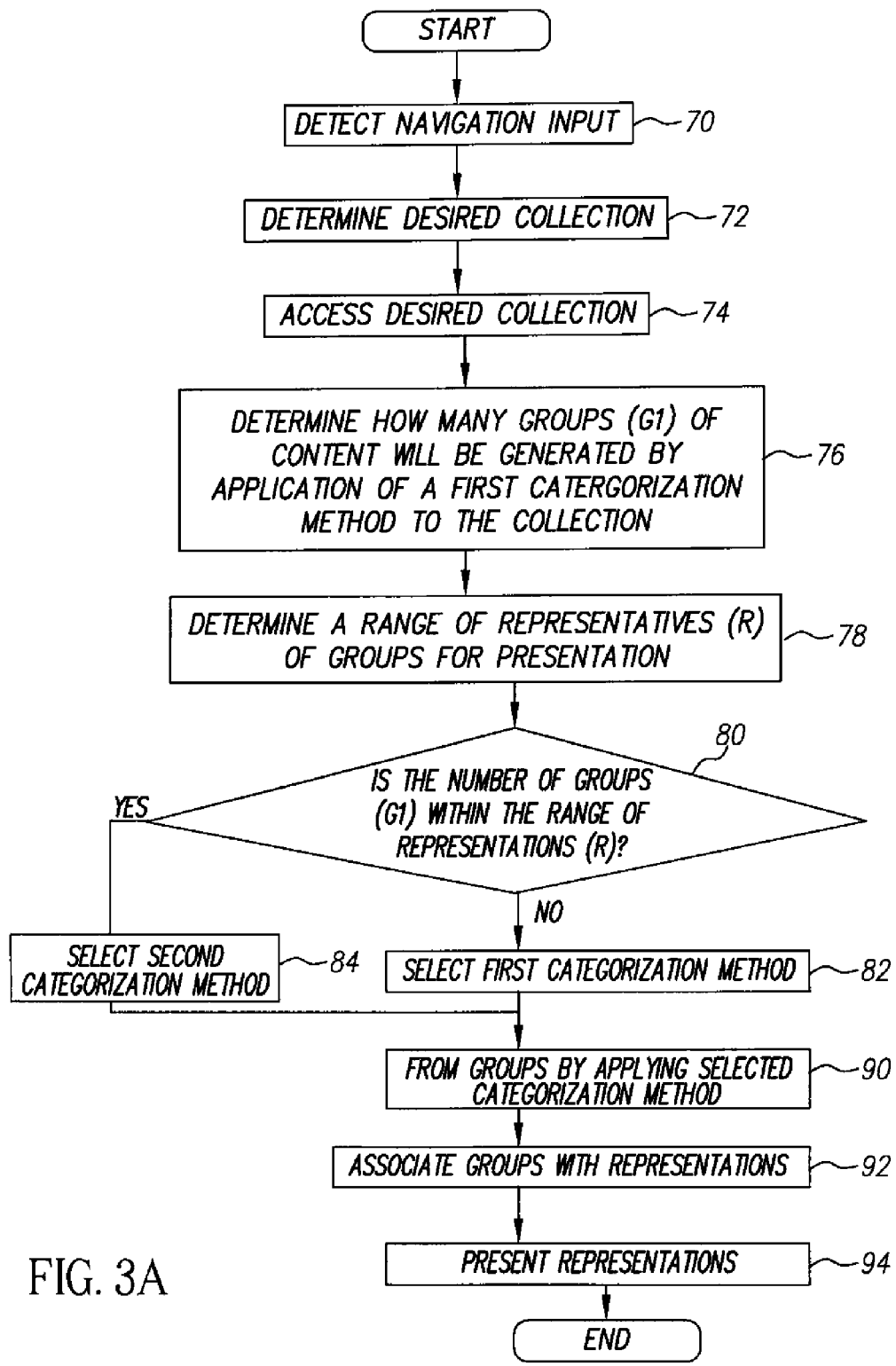
FIG. 3A illustrates one embodiment of a method for operating a display device.

FIGS. 3A and 3B show embodiments of methods for operating a display device. As is shown in both FIGS. 3A and 3B in a first step of the method, controller 12 senses that user interface 14 has been actuated in a manner indicating a desire to navigate through a group of images (step 70). After this, controller 12 then determines what collection of content data files is to be navigated (step 72). This too can be done in accordance with signals from user interface 14.

Figure 4:
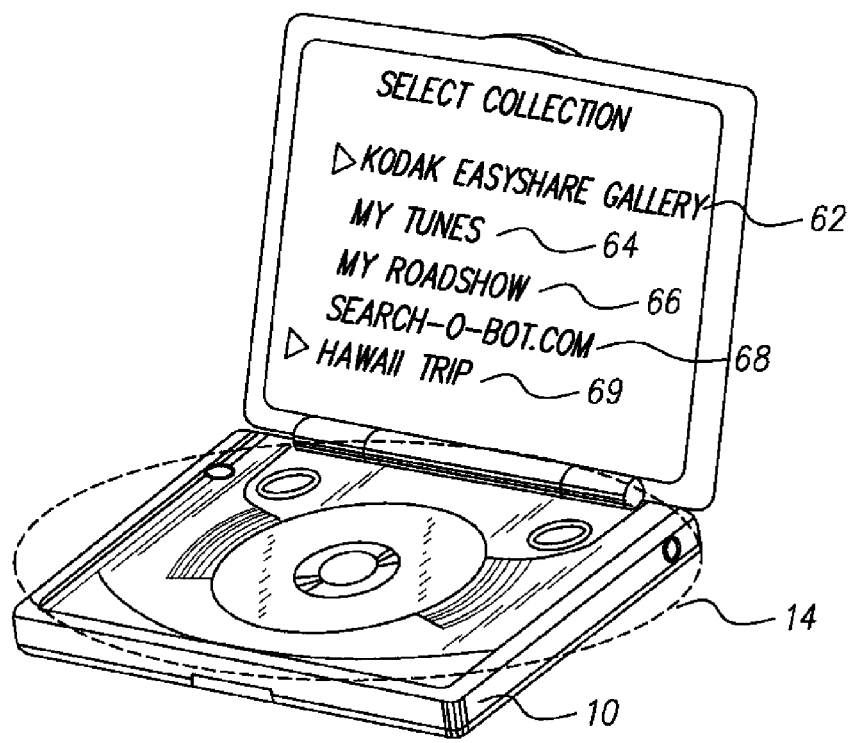
FIG. 4 illustrates one embodiment of a display device having a menu screen.

FIG. 4 illustrates one example of a choice screen presenting a range of possibilities of different possible content data file collections 62, 64, 66, 68 and 69 that could be accessed by an embodiment of display device 10. This range is provided for example only and is not limiting. The range of selections can be presented in textual form as illustrated or in graphical or other useful forms. In certain embodiments, audio system 38 can be used to provide an audio output indicating the availability of certain selections. In this example embodiment, a user of display device 10 uses user interface 14 to select one of the presented options, such as option 4: Hawaii trip.

After selection of the collection (step 72), controller 12 accesses the desired collection (step 74) and determines a number of groups (G1) that will be generated by a first categorization method when the content categorization method is applied to the collection (step 76). Such a determination can be made by actually applying the first categorization method to the collection or it can be made by using algorithms to predict the number of groups that will be formed when the first categorization method is applied. For example, in certain time based methods of categorization, it can be determined, for example, the method will determine a particular number of groups based upon the overall time period over which content data files were, for example, captured or otherwise obtained. This can be done however, without actually categorizing all of the content data files to form such groups. The number of groups (G1) of content data files that application of the first categorization method will form can be predicted in similar fashion for a variety of non-timeline based categorization methods. The first categorization method can take any known form of categorization method, some of which are described in greater detail below.

In the embodiment of FIGS. 3A and 3B, controller 12 then determines a range of representations (R) of groups of content data files that are to be presented using display 16 of display device 10 (step 78). As will be discussed in greater detail below the representations can comprise for example graphical icons that can be presented to represent groups of content data files.

In some display devices 10, the range of representations (R) can be made constant and can be preset or set in accordance with user preferences. However, in other display devices 10 the number of representations (R) can vary depending on the type of use to which the display device 10 is being put, the personal preferences of a user of display device 10 and other factors. Factors that might influence the selection of a range of representations in either a generally fixed or a variable selection embodiment can include image resolution of display 16, the physical size of display 16, the nature of the content within each group, the shape of display 16, the proportion of display 16 that is available for such presentation and a general understanding of human visual acuity and human short term memory. The range of representations (R) can be calibrated so that each representation provides sufficient visual information to permit a user to observe the representations and have a general understanding of the way in which content data files are grouped. Typically, the range of representations (R) is selected to allow the user to observe each representation on display 16 at a single time so that with a glance at a single display level presenting such representations a user can have a basic understanding of the general scope of content in the collection and a group structure that can easily guide a user of display device to access such content.

As is also illustrated in both FIGS. 3A and 3B, controller 12 then determines whether the number of groups (G1) generated by the first categorization method is within the range of representations (R) and uses this determination to determine whether to apply the first categorization method or a different categorization method (step 80).

In the embodiment of FIG. 3A, discrimination is made between a first categorization method and a second categorization method. In particular, when controller 12 determines that the number of groups (G1) generated by the first method is within the range of representations (R) (step 80), controller 12 selects the first method (step 82), however, when controller 12 determines that the number of groups (G1) generated by the first characterization method is not within the range of representations (R) (step 80) controller 12 selects a second different method. The difference between the first categorization method and second categorization method can comprise selecting a method of categorization that is wholly different from the first categorization method. Controller 12 can also provide a difference between a first categorization method and a second or other subsequent categorization method by altering the parameters used in the first method so that the second method uses the organizational strategy of the first method, but applied in a different way.

In the embodiment of FIG. 3B a different method is used to select a categorization method. In this embodiment, when controller 12 determines that the number of groups (G1) generated by the first characterization method is within the range of representations (R) (step 80) controller 12 selects the first categorization method (step 89). However, when controller 12 determines that the number of groups (G1) generated by the first characterization method is not within the range of representations (R) (step 80) controller 12 selects determines a number of groups (G2) generated by applying a second categorization method to the collection of content (step 81). Controller 12 then determines whether the number of groups (G2) generated by application of the second method to the collection of content data files is within the range of representations (step 83). When the number of groups (G2) generated by applying the second categorization method to the collection of content is within the range (step 83) the second categorization method is selected (step 89).

As is illustrated in FIG. 3B, where the second method does not generate a number of groups (G2) that is within the range of representations (R) (step 83) controller 12 is optionally adapted to make additional determinations as to the whether number of groups (GX) generated by one or more additional categorization methods (step 87) until an additional content categorization method is found that generates a number of groups (GX) that is within the range of representations (R). This method of categorization is then selected (step 89).

Controller 12 can use any of a variety of ways of choosing which of a plurality of available content categorization methods to use as a first, second, third or other method. In one embodiment, a preferred sequence can be used to choose which of a plurality of available content categorization methods are to be used as a first, second or other subsequent method. Controller 12 can make such a choice based upon the type of collection, the size of the collection, user preference or number of groups obtained using previously applied content categorization methods. Further, it will be appreciated that there are typically a variety of ways in which any categorization methods can be applied to a collection of content data files to organize the content data files into groups. Accordingly, as noted above controller 12 can be adapted to select different ways of applying a first categorization method and a second (or other additional) categorization method. Alternatively, controller 12 can be adapted to apply only one variant of a categorization method and to forgo use of that categorization method where that variant does not create the requisite number of groups.

In either of the embodiments of FIG. 3A or 3B, the categorization method that is selected is applied to use to form groups of content data files (step 92). This organizes the content in the collection into groups in accordance with the selected method.

It will be appreciated that such groups can be formed in a variety of fashions. For example, in a typical case, each different content data file can be grouped in the collection with a representation by establishing virtual links therebetween so that the representation can be used as a convenient point for locating all content data files that are associated with the representation. Alternatively, a collection can be stored or otherwise electronically reorganized for storage in a manner that is consistent with the selected method of categorization. Such storage can involve moving or reorganizing such content data files on remote devices if permissible, or copying such content data files to a new location, such as in memory 40, wherein such content data files can be stored in a manner that is in accordance with the grouping established by the characterization method.

Each formed group is then associated with a representation that can be presented on display 16 (step 92). The representation can have an appearance that is based upon the content itself, metadata associated with the content, the date of capture or generation of the content, the date upon which the content was provided to display device 10 or other such factors. For example, the appearance of a representation can incorporate or otherwise be based upon a single still image from a still image type of content data file or a so-called key frame from a video type of image content. The representation can also have an appearance that is based at least in part upon characterization method and/or other factors involved in organizing the content. Finally, the representation can also have an appearance that is based at least in part upon some type of data or metadata associated with one or more of the content data files of the group associated with that representation.

Figure 5:
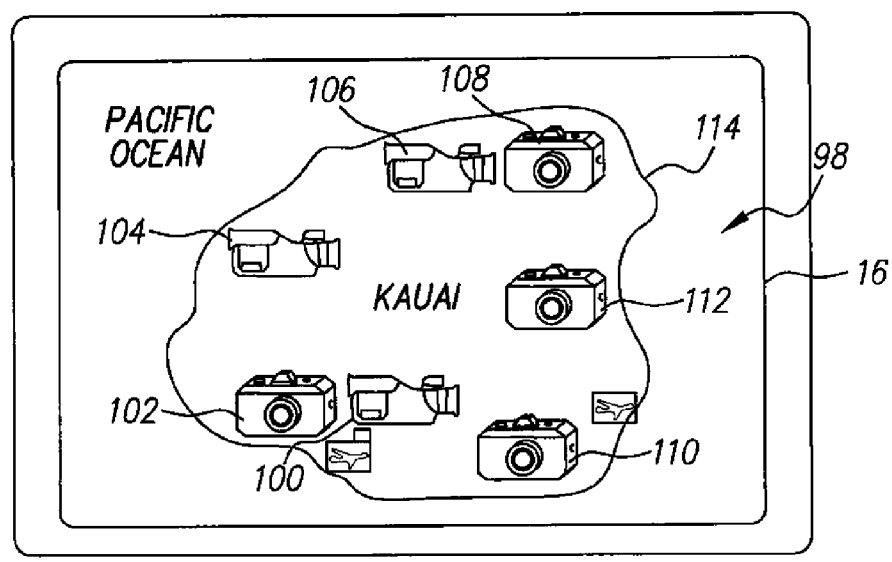
FIG. 5 illustrates another embodiment of a method for operating a display device.

The representations are then presented on display 16 (step 94). Typically such representations are presented in an ordered fashion that helps a user to understand the nature of such representations. For example, in FIG. 5, one example of a display device 10 is shown presenting a screen 98 with representations 100, 102, 104, 106, 108, 110 and 112. In this example, a location based grouping approach has been used to categorize the content and groups are illustrated relative to an organizational metaphor 114 that has the appearance of a map of a region in which groups of content data files in the collection were captured. From this one screen a user is enabled to, at a glance, identify the geographic scope of the collection of content data files and areas of the geographic region for which groups of content exist.

It will be appreciated that other organizational metaphors 114 can be provided that can be usefully applied in similar fashion for use with other representations.

Figure 6:
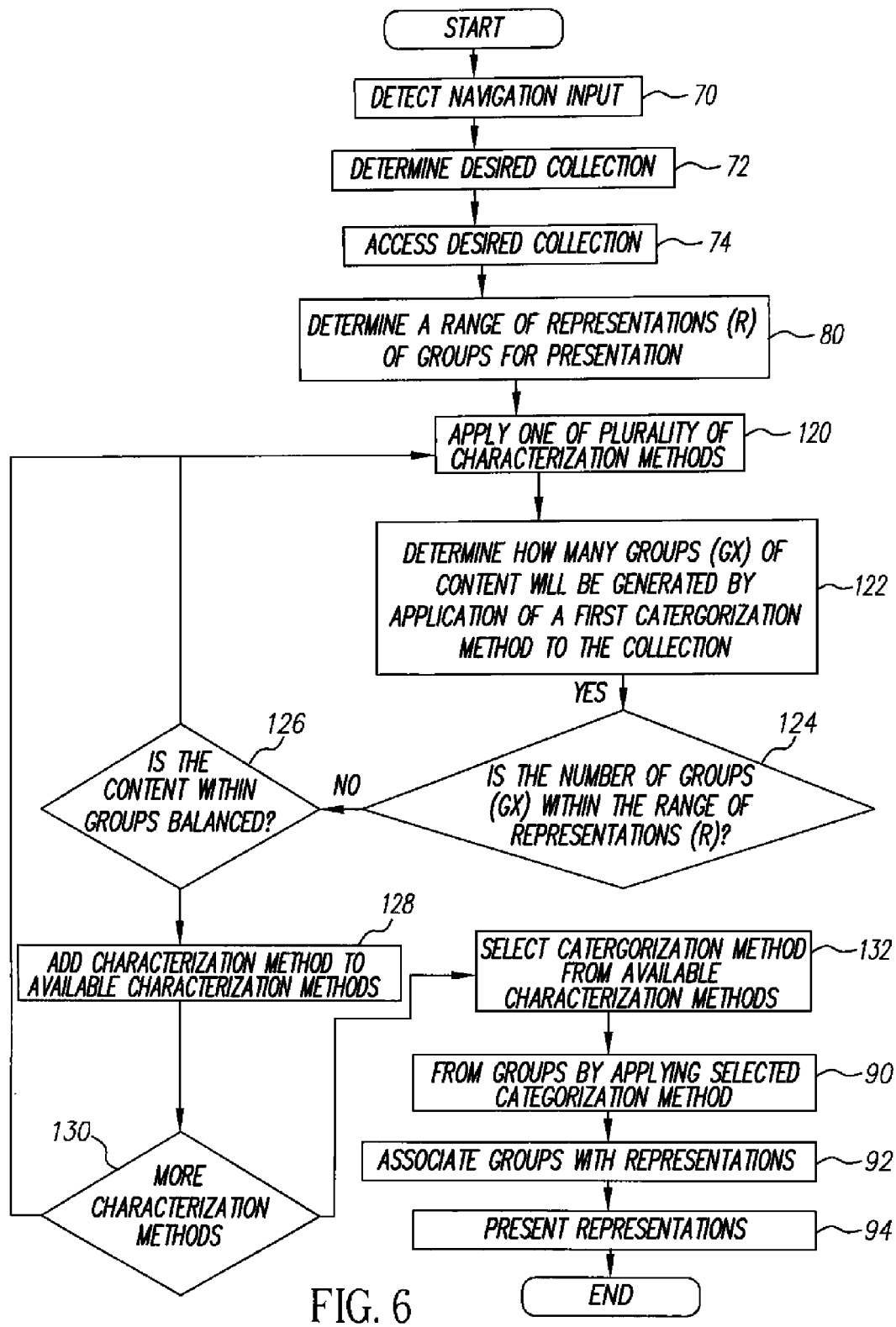
FIG. 6 is a flow diagram of another embodiment of a method for operating a display device.

It will also be appreciated that in other embodiments, controller 12, can select a categorization method using variations of the steps illustrated as steps 76-84 in the embodiment of FIGS. 3A and 3B. For example, in the embodiment of FIG. 6, controller 12 applies each of the plurality of characterization methods to the collection of content data files (steps 120, 130) and determines if each categorization method generates a number of groups that is within the range of representations (R) (steps 122 and 124). Controller 12 adds each categorization method that yields a number of groups (GX) that is within range of representations (R) to a set of available categorization methods (step 128). Controller 12 then selects a categorization method from the set of available methods. Where more than one characterization method is in the set of available characterization methods, controller 12 automatically selects one of the plurality (step 132). This automatic selection can be made on the basis of a preprogrammed priority of methods, based upon user preferences, based upon an amount of processing time required to form groups of the plurality of content data files, types of image content, metadata and/or combinations of thereof.

Figure 7:
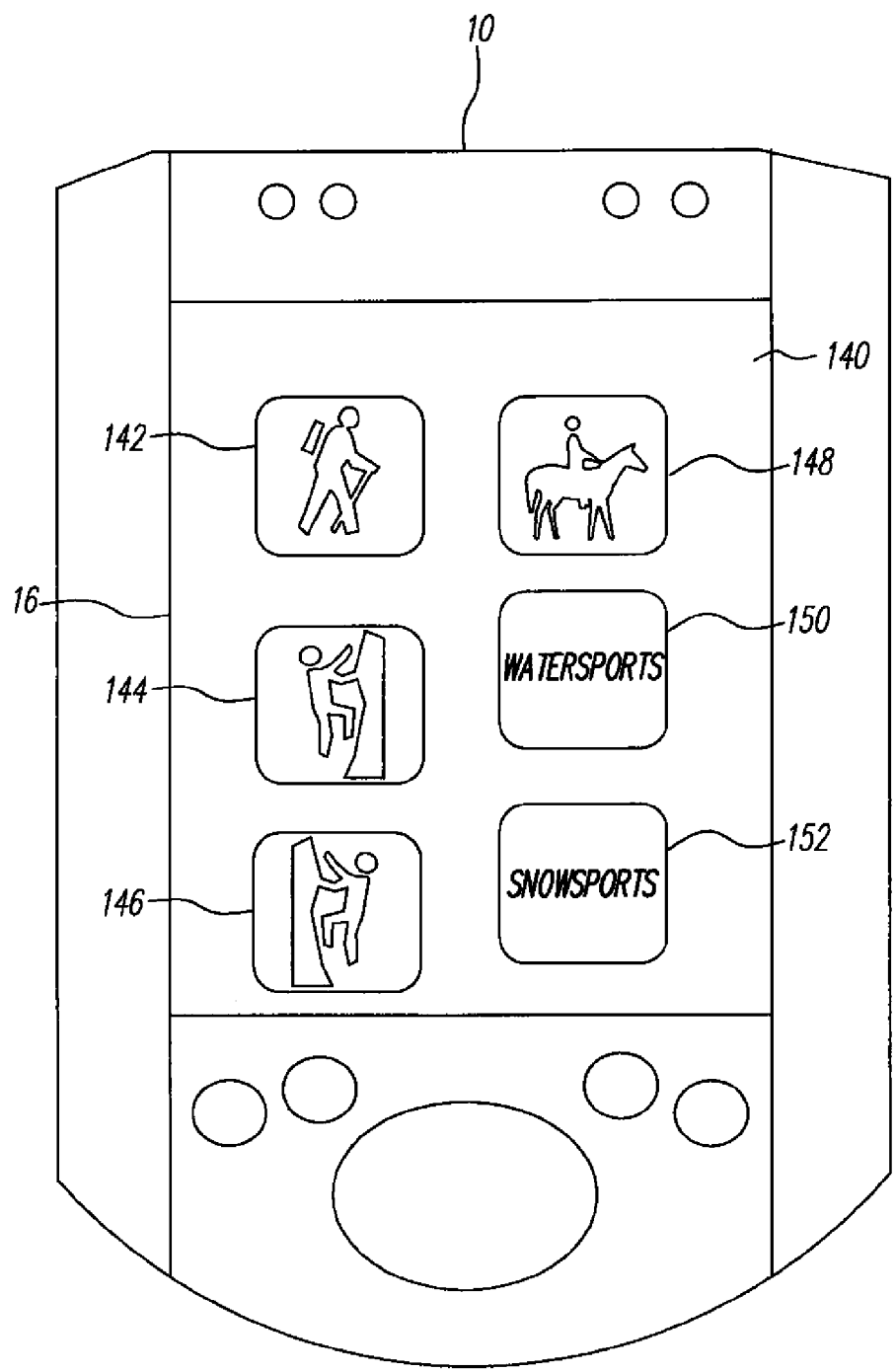
FIG. 7 illustrates one embodiment of a group screen.

A selection between more than one available categorization method can also be made by automatically selecting an available categorization method that requires a user to take the minimum number of steps to access any of the grouped images. For example, some categorization methods may categorize content data files into groups and sub groups within such groups. As is illustrated in FIG. 7, when a group formed by such an categorization method is activated, typically in response a user input action, a group screen 140 is activated that presents indicia associated with each of the content data files 142, 144, 146 and 148 associated with the group as well as sub-representations 150 and 152 of the content data files in the sub-groupings. Such indicia can comprise a thumbnail image based upon the associated content data file, text, or any other visual marker. Such indicia can be selected by a user to enable access to the associated content data file. To access content data files within the sub-groupings, a user must take an additional action selecting one of sub-representations 150 and 152.

Figure 8:
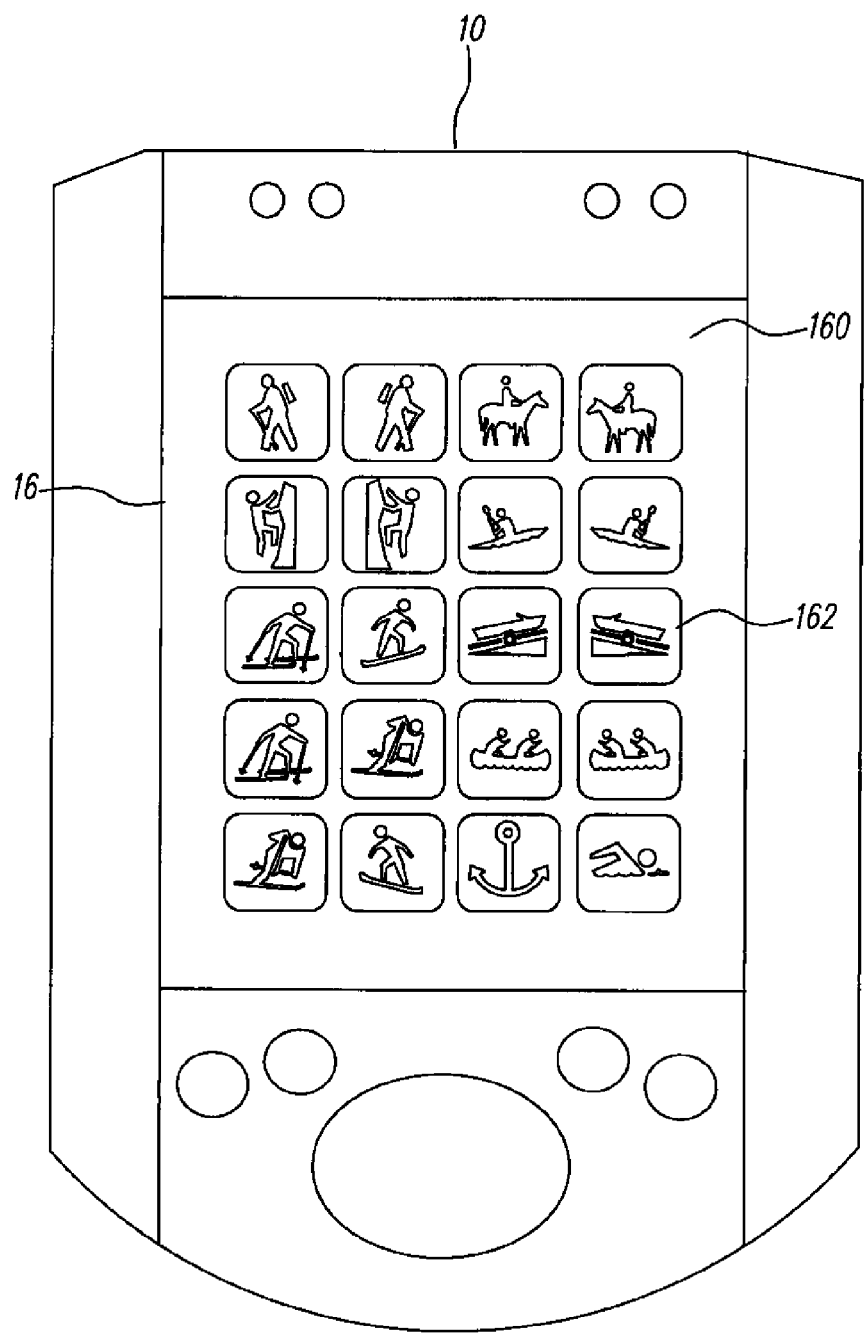
FIG. 8 illustrates another embodiment of a group screen.

In contrast as is illustrated in FIG. 8, another categorization method can cause groups to be formed that do not have subgroups and therefore, activating a representation for such a group causes a group screen 160 to be presented that does not present sub-representations and that presents indicia 162 representative of each content data file in the selected group. This permits access to each content data file in the selected group without requiring the additional act required when the categorization method of FIG. 7 is used.

Accordingly, in one embodiment of the invention, controller 12 can be adapted to perform the step of selecting between available categorization methods by selecting a categorization method that requires a user to take a minimum number of steps to access any of the grouped images.

Returning now to FIG. 6, an optional balance verification step 126 is shown. During balance verification step 126, controller 12 examines the volume of content data files in each group to ensure that the groupings of content data files are of use to a user in navigating through the content data files of the collection. Specifically, it will be understood that there may be circumstances where a certain characterization method is applied to a collection of content data files to yield a number of groups with one group having by way of example more than 90 percent of the content data files associated therewith and with other groups sharing the remaining 10 percent. The presentation of a display screen with groups having such an arrangement of content does not significantly assist the user in locating a content data file that is within the 90 percent group. Accordingly, controller 12 can select between available content categorization methods by excluding or lowering the priority of methods of content categorization that yield one or more groups having more than 30 percent of the content data files in the collection. It will be appreciated that other thresholds can be used for this purpose. It will also be appreciated that a balance verification step (step 126) can also be incorporated in other embodiments described herein including, but not limited to, the embodiment of FIG. 3B.

Content Data File Categorization Method

There are a variety of categorization methods that can be used to define groups of content data files within a collection. Accordingly the first categorization method, second categorization method or any other categorization method described above can comprise any known categorization method. The following provides a sampling of categorization methods that can be used. This sampling is not limiting.

One example of such a categorization method is a method that groups the content data files into a timestamp group based upon a timestamp associated with a content data files, such as a data of capture, a date of creation or a data of acquisition of a content data file. Such a method can, for example, organize the content into groups of content that represent different ranges of time within a time frame. For example, such a categorization method can group images into a timestamp group with each group representing a day, week or month of capture.

Another example categorization method can organize the content data files according to file groups or other storage locations based on file locations in which the content data files are stored. Another example categorization method can examine file names for content data files or file paths leading to content data files and can build groups based upon similarities or patterns in such file names or file paths.

Still another example categorization method can organize groups of content data files according to content metadata which can comprise any information that is associated with the content data files but that does not necessarily comprise part of the data representing the content.

Such metadata can be stored in the content data files or otherwise associated therewith. The metadata can describe the scene in a still image or video, such as a caption, and can also provide in a straightforward manner, information such as the date and time the picture was captured, the location from which the picture was captured, identify people or objects in the picture, and information regarding format and data structure.

Many prior art digital cameras can be programmed to automatically store metadata along with a captured content such as the date and time at which the content was captured or edited. More advanced digital cameras can also be programmed to automatically store along with the actual image, the location of picture capture by harnessing automatic location systems. For example, the Global Positioning Satellite (GPS) is a well-known method for pinpointing the location of a special GPS receiver with a fairly high degree of accuracy. Other methods include the use of Radio Triangulation (RT) systems. Using such an approach, a GPS receiver can be either incorporated in the hardware of the digital camera, or located nearby. A subsequent image file will contain not only the raw image data, but also a date and time stamp, along with header information related to the location of the GPS receiver when the image is collected.

Where content data files are associated with location information, a categorization method can be used that organizes content data files into groups using location information that is associated with the content data files such as GPS type global positioning data or other location information that represents a location of capture, storage or acquisition of a content data file.

Still more advanced digital cameras may contain pattern recognition software for identifying objects and people in an image, and for converting such information to metadata, and histogram software for generating bar chart or other such displays representing color illumination values within an image.

In yet another example, of a categorization method, the content of the content data files is analyzed to identify particular characteristics of the content of still image, video and/or audio data stored therein. For example, image analysis techniques can be used to identify particular image types such as landscape images, facial images, group images, macro images, night images, flash enabled images, or images having particular subject matter such as cars, airplanes, etc. Similarly, audio signal recognition can be used to identify particular sounds. The presence of such subject matter can also be determined based upon metadata such as user-entered annotations.

Aspects of the processing of the content data files can also be used as a discriminator for particular categorization methods, for example, organization of groups in some categorization methods can be based, at least in part upon, detecting content data files that are stored in particular formats, subject to modifications or the application of special effects such as overlays, added text, color tone modifications such the imposition black and white, grayscale, sepia tone scales, particular audio modifications and other factors can be used to organize Aspects of the content data files that indicate the quality of the content in such data files can also be used as a discriminating factor in other categorization methods. Examples of such quality measurements include analysis of an image content for focus characteristics, contrast characteristics, color characteristics, noise levels, signal-to-noise ratio, undesirable image artifacts or the analysis of audio data to for sound quality metrics such as noise levels, channels of audio and characteristics of the sampling used for such audio signals.

Still more methods that can be used to categorize content data files include, but are not limited to, the methods described in any of the following cross-referenced U.S. Patents and patent applications each of which is hereby incorporated by reference: U.S. Pat. No. 6,351,556 entitled METHOD FOR AUTOMATICALLY COMPARING CONTENT OF IMAGES FOR CLASSIFICATION INTO EVENTS issued Feb. 26, 2002 in the name of Loui et al.; U.S. Pat. No. 6,606,409 entitled FADE-IN AND FADE-OUT TEMPORAL SEGMENTS issued Aug. 12, 2003 in the name of Warnick et al.; U.S. Pat. No. 6,606,411 entitled METHOD FOR AUTOMATICALLY CLASSIFYING IMAGES INTO EVENTS issued Aug. 12, 2003 in the name of Loui et al.; U.S. Pat. No. 6,810,146 entitled METHOD AND SYSTEM FOR SEGMENTING AND IDENTIFYING EVENTS IN IMAGES USING SPOKEN ANNOTATIONS issued Oct. 26, 2004 in the name of Loui et al.; U.S. Pat. No. 6,847,733 entitled RETRIEVAL AND BROWSING OF DATABASE IMAGES BASED ON IMAGE EMPHASIS AND APPEAL issued Jan. 25, 2005 in the name of Savakis et al.; U.S. Pat. No. 6,865,297 entitled METHOD FOR AUTOMATICALLY CLASSIFYING IMAGES INTO EVENTS IN A MULTI-MEDIA AUTHORING APPLICATION issued Mar. 8, 2005 Loui et al.; U.S. Pat. No. 6,915,011 entitled EVENT CLUSTERING OF IMAGES USING FOREGROUND/BACKGROUND SEGMENTATION issued Jul. 5, 2005 in the name of Loui et al.; U.S. Pat. No. 6,937,273 entitled INTEGRATED MOTION-STILL CAPTURE SYSTEM WITH INDEXING CAPABILITY issued Aug. 30, 2005 in the name of Loui; and U.S. Patent Application Publication No. 2002/0075329 entitled PICTURE DATABASE GRAPHICAL USER INTERFACE UTILIZING MAP-BASED METAPHORS FOR EFFICIENT BROWSING AND RETRIEVING OF PICTURES published Jun. 20, 2002 in the name of Prabhu et al.; U.S. Patent Application Publication No. 2002/0168108 entitled EVENT CLUSTERING OF IMAGES USING FOREGROUND/BACKGROUND SEGMENTATION published Nov. 14, 2002 in the name of Loui et al.; U.S. Patent Application Publication No. 2003/0009493 entitled USING DIGITAL OBJECTS ORGANIZED ACCORDING TO A HISTOGRAM TIMELINE published Jan. 9, 2003 in the name of Parker et al.; U.S. Patent Application Publication No. 2003/0059107 entitled METHOD AND SYSTEM FOR AUTOMATED GROUPING OF IMAGES published Mar. 27, 2003 in the name of Sun et al.; U.S. Patent Application Publication No. 2003/0198390 entitled METHOD FOR AUTOMATICALLY CLASSIFYING IMAGES INTO EVENTS published Oct. 23, 2003 in the name of Loui et al.; U.S. Patent Application Publication No. 2004/0208365 entitled METHOD FOR AUTOMATICALLY CLASSIFYING IMAGES INTO EVENTS published Oct. 21, 2004 in the name of Loui et al.; and U.S. Patent Application Publication No. 2005/0010602 entitled SYSTEM AND METHOD FOR ACQUISITION OF RELATED GRAPHICAL MATERIAL IN A DIGITAL GRAPHICS ALBUM published Jan. 13, 2005 in the name of Loui et al.

The invention has been described in detail with particular reference to certain preferred embodiments thereof, but it will be understood that variations and modifications can be effected within the spirit and scope of the invention.

PARTS LIST 10 display device
12 controller
14 user interface
16 display
18 signal processor
20 content source
22 image capture system
24 communication interface
26 memory interface
28 other displays
30 lens system
32 image sensing system
38 audio system
40 memory
42 internal memory
46 removable memory card
50 digital camera
52 handheld portable computer
54 personal computer
56 communication network
60 storage device
62 data collection
64 data collection
66 data collection
68 data collection
69 data collection
70 step
72 step
74 step
76 step
78 step
80 step
82 step
84 step
86 step
88 step
90 step
92 step
94 step
98 step
100 representation
102 representation
104 representation
106 representation
108 representation
110 representation
112 representation
114 graphical metaphor
120 step
122 step
124 step
126 step
128 step
130 step
132 step
140 group screen
142 indicia of content data file
144 indicia of content data file
146 indicia of content data file
148 indicia of content data file
150 sub-representation
152 sub-representation
160 group screen
162 indicia of content data files

The invention claimed is:

1. A method implemented by a computer, the method comprises:
    identifying a collection of content data files stored in storage locations accessible by the computer, each content data file comprising image, video, or audio data;
    determining a number of groups of the content data files that are representable on a display coupled to the computer;

applying a first categorization method to the identified collection of content data files including determining a first number of groups of the content data files that are generated thereby, the first categorization method selected from a categorization method group consisting of: geographic location of where the content data files were captured; number of steps required to access the content data files in a group; date of when the content data files were captured; the storage file locations in which the content data files are stored; people identified in images in the content data files; object types in images in the content data files; color illumination values of images in the content data files; camera settings used to capture images in the content data files; image formats used to store images in the content data files; special effects applied to images in the content data files; and quality measures of the content data files;

using the first categorization method for representing the first number of groups on the display when the first number of groups is within the determined number of groups that are representable on the display;

applying a second categorization method to the identified collection of content data files when the first number of groups is not within the determined number of groups that are representable on the display including determining a second number of groups of the content data files that are generated thereby, the second categorization method selected from the categorization method group and different from the first categorization method; and using the second categorization method for representing the second number of groups on the display when the first number of groups is not within the determined number of groups that are representable on the display and when the second number of groups is within the determined number of groups that are representable on the display.

2. The method of claim 1, wherein at least one of said first and second categorization methods is a method that groups the content data files into timestamp groups based on a timestamp associated with the content data files.

3. The method of claim 1, further comprising the steps of:
applying a third categorization method to the identified collection of content data files including determining a third number of groups of the content data files that are generated thereby, the third categorization method selected from the categorization method group and different from the first categorization method and different from the second categorization method; and using the third categorization method for representing the third number of groups on the display when the first number of groups is not within the determined number of groups that are representable on the display, the second number of groups is not within the determined number of groups that are representable on the display, and when the third number of groups is within the determined number of groups that are representable on the display.

4. The method of claim 1, wherein the step of applying includes the step of selecting the first categorization method from said plurality of categorization methods by prioritizing said plurality of categorization methods that are completed more quickly before applying categorization methods that require more time to complete.

5. The method of claim 1, wherein the step of applying includes the step of selecting the first categorization method from said a plurality of categorization methods by prioritizing said plurality of categorization methods that apply user preferred categorization methods before applying other categorization methods.

6. The method of claim 1, wherein at least one of said first and second categorization methods is a method that groups the content data files based on file locations of the content data files.

7. The method of claim 6, wherein the file location groups include content data files having a common file name portion.

8. The method of claim 1, wherein at least one of said first and second categorization methods categorizes content data files into groups that include content data files that are located in a file having a common file modification date.

9. The method of claim 1, wherein the geographic location method includes content data files having content that was captured within a predetermined distance from each other.

10. The method of claim 1, wherein at least one of said first and second categorization methods is a method that groups the content data files into groups based on the image, audio, or video content of the content data files.

11. The method of claim 10, wherein said content group includes content data files that are grouped into groups of content data files that have had a common special effect applied thereto.

12. The method of claim 1, wherein at least one of said first and second categorization methods is a method that groups the content data files according to said quality measures of the content data files.

13. The method of claim 12, wherein said quality groups includes groups of content data files that have image components with common ranges of color, focus, noise levels, signal-to-noise ratios, color characteristics, image artifacts, or contrast characteristics or content data files that have audio data with common ranges of noise levels, signal-to-noise ratios, channels of audio or characteristics of the sampling used for such audio signals.

14. The method of claim 1, further comprising the step of providing an organizational metaphor including organizing the groups on the display relative to the organizational metaphor.

15. The method of claim 1, further comprising the step of representing each of the groups on the display by using a separate icon that is activatable to cause a second display to be presented containing links to individual ones of the content data files organized into the group of content data files that the icon represents.

16. The method of claim 1, wherein the step of identifying a collection of content data files comprises the steps of entering a search request into an electronic search engine and the electronic search engine generating the identified collection of content data files.

17. The method of claim 1, further comprising the steps of determining when the application of the first categorization method will generate group of content data files including more than thirty (30) percent of the content data files in the identified collection and selecting a different content categorization method.

18. A method implemented by a computer, the method comprises:
accessing a plurality of digital images stored in storage locations accessible by the computer;
determining a numerical range of representations that are displayable on an imaging device coupled to the computer, each of said representations being associated with one said of groups of said digital images;
determining a number of groups of said digital images formed as a result of an application of each of a plurality of categorization methods, said each of a plurality of categorization methods different from each other but selected from a categorization method group consisting of: geographic location of where the digital images were captured; number of steps required to access the digital images in a group; date of when the digital images were captured; the storage file locations in which the digital images are stored; people identified in the digital images; objects types in the digital images; color illumination values of the digital images; camera settings used to capture the digital images; image formats used to store the digital images; special effects applied to the digital images; and quality measures of the digital images; and selecting a categorization method from said plurality of categorization methods that formed a number of groups of said digital images within the numerical range of representations for visually representing said groups of said digital images on the imaging device.

19. The method of claim 18, further comprising:

identifying more than one of the categorization methods that formed a number of groups of said digital images within the numerical range of representations and wherein the selecting step comprises selecting from among the identified categorization methods, on the basis of at least one of a preprogrammed priority of methods, user preferences, an amount of time required to form groups using the identified categorization methods, or a predetermined preference as to the number of representations.

20. The method of claim 18, further comprising the steps of:

identifying more than one of the categorization methods that formed a number of groups of said digital images within the numerical range of representations and wherein the selecting step comprises selecting from among the categorization method group said minimum number of steps to access the digital images in a group.

21. A display device comprising:

a plurality of content data files stored in a storage location accessible by the display device, each content data file including information for being presented on a display coupled to the display device;

a user interface for inputting a user request for the content data files;

a controller coupled to the display device that receives the user request for the content data files and accesses the content data files in response thereto, the controller determining a number of groups of the content data files that are generated by each of a plurality of different content data file categorization methods, said each of a plurality of different content data file categorization methods different from each other but selected from a categorization method group consisting of: geographic location of where the content data files were captured; number of steps required to access the content data files in a group; date of when the content data files were captured; the storage file locations in which the content data files are stored; people identified in images in the content data files; object types in images in the content data files; color illumination values of images in the content data files; camera settings used to capture images in the content data files; image formats used to store images in the content data files; special effects applied to images in the content data files; and quality measures of the content data files;

wherein said controller selects one of the content data file categorization methods based upon said number of content data file groups that it generates being within a predetermined range of numbers; and wherein said controller uses said selected one of the content data file categorization methods for representing the groups of the content data files generated thereby on the display coupled to the display device.

* * * * *